(12) United States Patent  
Diefenbach (10) Patent No.: US 11,755,569 B2  
(45) Date of Patent: Sep. 12, 2023

(54) METHOD FOR PROCESSING A QUESTION IN NATURAL LANGUAGE

(71) Applicants: UNIVERSITE JEAN MONNET SAINT ETIENNE, Saint Etienne (FR); CENTRE NATIONAL DE LA RECHERCHE SCIENTIFIQUE (CNRS), Paris (FR)

(72) Inventor: Dennis Diefenbach, Saint Etienne (FR)

(73) Assignees: UNIVERSITE JEAN MONNET SAINT ETIENNE, Saint Etienne (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 271 days.

(21) Appl. No.: 16/962,540

(22) PCT Filed: Jan. 18, 2019

(86) PCT No.: PCT/EP2019/051221  
§ 371 (c)(1),  
(2) Date: Jul. 16, 2020

(87) PCT Pub. No.: WO2019/141801  
PCT Pub. Date: Jul. 25, 2019

(65) Prior Publication Data  
US 2020/0409943 A1    Dec. 31, 2020

(30) Foreign Application Priority Data

Jan. 18, 2018 (EP) .................................. 18305035

(51) Int. Cl.  
*G06F 16/242* (2019.01)  
*G06F 16/2457* (2019.01)  
(Continued)

(52) U.S. Cl.  
CPC .......... *G06F 16/243* (2019.01); *G06F 16/248* (2019.01); *G06F 16/24578* (2019.01); *G06F 40/205* (2020.01); *G06F 40/40* (2020.01)

(58) Field of Classification Search  
CPC ...... G06F 16/243; G06F 16/33; G06F 16/248; G06F 40/40; G06F 40/205; G06F 16/3329  
(Continued)

(56) References Cited

U.S. PATENT DOCUMENTS

2009/0193328 A1* 7/2009 Reis ..................... G06F 16/345 715/231  
2009/0216714 A1* 8/2009 Gonzalez .............. G06F 16/273  
(Continued)

FOREIGN PATENT DOCUMENTS

| CN | 105630881 A | * | 6/2016 | ............. G06F 16/81 |
| CN | 106528849 A | * | 3/2017 | ......... G06F 16/2433 |
| EP | 3179384 A1 |   | 6/2017 | |

OTHER PUBLICATIONS

Zhou et al, "SPARK: Adapting Keyword Query to Semantic Search" in "ISWC/ASWC LNCS 4825", p. 694-707, Nov. 11, 2007, Springer.*  
(Continued)

*Primary Examiner* — Grace Park  
*Assistant Examiner* — Abdullah A Daud  
(74) *Attorney, Agent, or Firm* — Arrigo, Lee, Guttman & Mouta-Bellum LLP (57) ABSTRACT

The present invention is related to a method for processing a question in natural language received at a server (2), comprising performing by a processing unit (21) of the server (2) steps of: (a) for each n-gram of the question which is not a stop word, from at least one given knowledge base of entities linked by relations, identifying as initial entities and initial relations the entities and relations of the knowl-  
(Continued)

edge base matching said n-gram; (b) generating a set of possible queries for entities or relations of said given knowledge base, as a function of the initial entities and initial relations identified for all the n-gram of the question; (c) ranking each query of said set of possible queries as a function of at least one predetermined criterion, so as to identify a top-ranked possible query; (d) executing said top-ranked possible query, and returning the result entities or relations.

11 Claims, 2 Drawing Sheets

(51) Int. Cl.
*G06F 16/248* (2019.01)
*G06F 40/40* (2020.01)
*G06F 40/205* (2020.01)

(58) Field of Classification Search
USPC .......................................................... 707/723
See application file for complete search history.

(56) References Cited

U.S. PATENT DOCUMENTS

| | | | | |
|---|---|---|---|---|
| 2013/0173604 A1* | 7/2013 | Li | .......................... | G06F 16/951 |
| | | | | 707/723 |
| 2014/0304251 A1* | 10/2014 | Bornea | ................ | G06F 16/9024 |
| | | | | 707/718 |
| 2014/0358890 A1* | 12/2014 | Chen | .................... | G06F 16/9535 |
| | | | | 707/710 |
| 2016/0072899 A1* | 3/2016 | Tung | ..................... | H04L 41/145 |
| | | | | 709/223 |
| 2016/0314121 A1* | 10/2016 | Arroyo | ................ | G06F 16/3344 |
| 2020/0185057 A1* | 6/2020 | Leake | .................... | G11C 13/02 |
| 2020/0409943 A1* | 12/2020 | Diefenbach | ......... | G06F 16/3329 |

OTHER PUBLICATIONS

Dennis Diefenbach, Vanessa Lopez, Kamal Singh, Pierre Maret. Core Techniques of Question Answering Systems over Knowledge Bases: a Survey. Knowledge and Information Systems (KAIS), Springer, 2017. hal-01637143.

Zhou et al., "SPARK: Adapting Keyword Query to Semantic Search," In "LNCS 4825", Nov. 11, 2007, Springer.

Thanh Tran, et al., "Top-k Exploration of Query Candidates for Efficient Keyword Search on Graph-Shaped (RDF) Data," ICDE '09, IEEE 25th Internatinoal Conference on Data Engineering, Mar. 29, 2009, pp. 405-416.

Dilek Hakkani-Tur, et al., "Probabilistic Enrichment of Knowledge Graph Entities for Relation Detection in Conversational Understanding," Proc. INTERSPEECH, Sep. 14, 2014, pp. 2113-2117.

* cited by examiner

METHOD FOR PROCESSING A QUESTION IN NATURAL LANGUAGE

FIELD OF THE INVENTION

The invention concerns the field of the Semantic Web.

More precisely, the invention relates to a method for processing a question in natural language.

BACKGROUND OF THE INVENTION

The "Semantic Web" can be seen as an extension of the Web which promote a common framework, i.e. common data formats and exchange protocols, that allows data to be shared and reused, in particular so as to make them accessible and usable by machines.

Thanks to the development of the Semantic Web, a lot of structured data has become available in the form of knowledge bases (KBs). Nowadays, there are KBs about media, publications, geography, life-science, etc. Most notably, databases such as DBpedia or Freebase contain millions of concepts from general encyclopedic knowledge, and are still exploring the internet to gather new concepts.

KBs are generally under the form of semantic graphs of linked items named entities. RDF (Resource Description Framework) is the language the most often used for such semantic graphs.

The atomic data element in the RDF data model is called "semantic triple", or simply triple. A triple is a set of three components that codifies a statement in the form of subject-predicate-object expressions. The predicate defines a property of the subject, and the object is the value of this property.

Each triple represents one edge in the semantic graph: the subject is the name of the node where the edge starts, the predicate is the label of the edge, and the object is either the name of the node where the edge ends or a literal value (for instance a text, a number, etc.)

The mentioned items of a semantic graph named "entities" (i.e. the subjects of triples) are to be understood as a basic unit of computationally represented meaning, usually embodying a topic of interest. An entity has a representation intended for human consumption (sometimes a plurality of representations, when the same entity is known under more than one name), and an identifier (called a IRI, International Resource Identifier, an extension of the URI, Uniform Resource Identifier) for identification by machines. As already explained, the entity meaning is further specified by possible properties, that may have literal values or point to another concept (examples of concepts will be presented below). Properties that point to other concepts create the links between entities named "relations" that constitute the semantic graph.

Each element of the graph is either an entity or a relation, even if their might be subtypes, for instances "classes" as meta-entities. In the example of DBpedia, each entity corresponds to a Wikipedia page, and each relation is a hyperlink from a page to another.

Question Answering (QA) is an old research field in computer science which aims at easily using these KBs for automatically processing user's questions, inputted in natural language. An overview of the QA field can be read in the publication "*Core techniques of question answering systems over knowledge bases: a survey*" by Dennis Diefenbach, Vanessa Lopez, Kamal Singh, Pierre Maret, in Knowledge and Information Systems (2017).

Such processing starts with a step of translating an inputted question (in natural language) to a query in a language that can be accepted by a target KB, in particular SPARQL (recursive acronym for "SPARQL Protocol and RDF Query Language"). SPARQL is indeed a language made to retrieve and manipulate data stored in RDF format.

This translating step generally comprises decomposing the inputted question and detecting phrases, mapping the detected phrases into semantic items (entities or relations), grouping the mapped semantic items into semantic triples, and finally generating the correct SPARQL query.

However, properly performing these steps is not easy, in particular decomposing the question and mapping its element, as the natural language is often ambiguous. The known methods propose understanding the question through recognition of semantic patterns and complex analysis of the natural language.

For instance, patent application EP3179384 proposes to perform uncertain interference on each proposition so as to calculate a "confidence" of each proposition and reducing ambiguity.

These methods are satisfactory, but are generally directed to a single language (mostly English), so it is difficult or even impossible to port them to new languages. Indeed, grammar and syntax grandly differ from one language to another, and tools have to be adapted. Moreover, the known methods for translating a natural language question into a query often imply learning using training data which is difficult and expensive to create.

In addition, the known methods are also generally directed by a single KB: they make particular assumptions on how the knowledge is modelled in a given KB (generally referred to as "structural gap").

Consequently, there is still a need for an improved method for parsing a question in a knowledge base which could be multilingual, and/or KB-agnostic.

SUMMARY OF THE INVENTION

According to a first aspect, the invention proposes a method for processing a question in natural language received at a server, comprising performing by a processing unit of the server steps of:
(a) for each n-gram of the question which is not a stop word, from at least one given knowledge base of entities linked by relations, identifying as initial entities and initial relations the entities and relations of the knowledge base matching said n-gram;
(b) generating a set of possible queries for entities or relations of said given knowledge base, as a function of the initial entities and initial relations identified for all the n-gram of the question;
(c) ranking each query of said set of possible queries as a function of at least one predetermined criterion, so as to identify a top-ranked possible query;
(d) executing said top-ranked possible query, and returning the result entities or relations Preferred but non-limiting features of the present invention are as follows:

each query is a SPARQL query;

each possible query is generated at step (b);

each query of said set of possible queries contains as parameter at least one of the initial entities and initial relations, and matches at least one predetermined pattern;

each query of said set of possible queries contains up to K connected triples that can be created starting from the initial entities and initial relations;

K=2 and each query of said set of possible queries follows one of the patterns:

SELECT/ASK var WHERE {s1 s2 s3.}
SELECT/ASK var WHERE {s1 s2 s3. s4 s5 s6.}.

each possible query of said set gives a non-empty result;

step (b) comprises computing the pairwise distance between every initial entity or initial relation, and recursively creating all connected triple patterns from the initial entities and initial relations with up to K triples as a function of the computed pairwise distances;

computing the pairwise distance between every initial entity or initial relation comprises performing a breadth-first search in an undirected way from every initial entity only, using Header-Dictionary-Triple as an indexing structure;

recursively creating all connected triple patterns from the initial entities and initial relations with up to K triples as a function of the computed pairwise distances comprises, for each integer k lower than K, attempting to add each theoretical triple that can be created starting from the initial entities and initial relations to each created pattern of k triples;

a theoretical triple that can be created starting from the initial entities and initial relations can be added to a created pattern of k triples if said theoretical triple matches with every triple of said created triple pattern a possible combination of pairwise distances between their initial entities and/or initial relations;

step (d) comprises the previous calculation of a confidence score for the top-ranked possible query, said top-ranked possible query being executed only if said confidence score is above a threshold;

an entity or a relation of the knowledge base matches a n-gram if a name of said entity or relation and the n-gram have a common stem;

at least the following criteria are used in step (c):
a number of variables in the query;
a number of triples in the query;
a number of the words in the question which are covered by the query;
at least the following criteria are further used in step (c):
An edit distance of a label in the knowledge base of each initial entity and initial relation used as parameter of the query and the word in the question it is associated to;
a sum of the relevance of the initial entities and initial relations used as parameters in the query;

In a second and a third aspect are proposed a computer program product comprising instructions which, when the program is executed by a computer, cause the computer to carry out the method according to the first aspect; and a computer-readable medium comprising instruction which, when executed by a computer, cause the computer to carry out the method according to the first aspect.

BRIEF DESCRIPTION OF THE DRAWINGS

The above, and other objects, features and advantages of this invention, will be apparent in the following detailed description, which is to be read in connection with the accompanying drawings wherein.

DETAILED DESCRIPTION OF THE INVENTION

Environment

Figure 1:
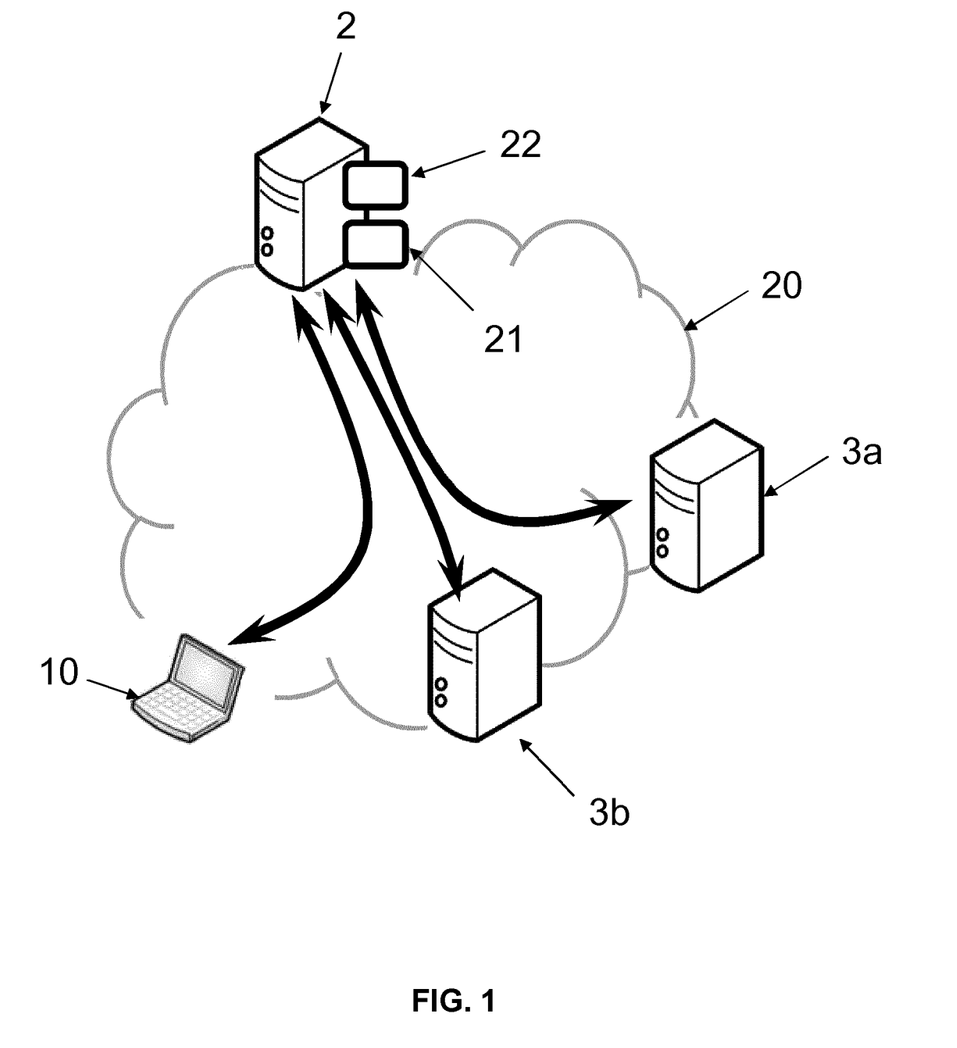
FIG. 1 represents the environment in which the method according to the invention is carried out.

With reference to FIG. 1, the invention concerns a method for processing a question in natural language received at a server 2 performed by a processing unit 21 (i.e. a processor) of the server 2.

At least one knowledge base (KB) is hosted at at least one remote server 3a, 3b, i.e. stored on a memory of the server 3a, 3b. For the sake of clarity, FIG. 1 represent two KBs each being hosted by a single remote server, but it is to understood that a KB could be hosted by a plurality of servers.

In the following description, we will describe the example wherein the KB used is DBpedia, but other KBs such as Freebase or Wikidata could be identically used, possible in addition to DBpedia. Besides, the present method can use several KBs, possibly simultaneously, i.e. an answer to the question is searched for in the various KBs at the same time.

As explained, a KB is preferably a semantic graph of linked entities. In other words, the KB is defined as:
a collection of entities constituting vertices of a graph, and
a collection of relations between entities constituting edges of the graphs.

In more mathematical terms, a KB is considered as a directed labeled graph G=(V,E,f), such that:

V is a non-empty set, called the vertex set, defining the entities;

E is a set, called edge set, such that $E \subset \{(v,w):v,w \in V\}$, i.e. a subset of the pairs of V;

For a set L called labeled set, f is a function $f:E \rightarrow L$, i.e. a function that assigns to each edge a label $p \in L$. An edge is indicated with label p as e=(v,p,w). The labels define the relations (it is to be understood that two distinct pairs of vertices could be respectively linked by edges having the same label, i.e. defining the same relation).

For example, the entity named "Jean Guitton" is linked to an entity "philosopher" by a first relation "type", and linked to another entity "Saint-Etienne" by another relation "birthplace". Indeed, Jean Guitton was a philosopher who was born in Saint-Etienne.

Thus, in the semantic graph there is a vertex labelled "Jean Guitton" connected to the two vertices labelled "philosopher" and "Saint-Etienne" through oriented edges (starting from "Jean Guitton") respectively labelled "philosopher" and "Saint-Etienne".

Said question in natural language is typically inputted by a user at a terminal 10, for instance a personal computer. The terminal 10, the servers 2, 3a, 3b are pieces of equipment connected by a network 20, in particular internet. It is to be noted that the server 2 for processing is possibly the same equipment as terminal 10 or servers 3a, 3b, i.e. the server 2 is not necessary a specific equipment, and some steps of the invention may be performed by a processing unit of the terminal 10 and/or of remote servers 3a, 3b.

The invention is not limited to a specific environment, and the terminal 10 shall be understood as any "client" from which the KBs could be accessed through the network 20.

The question may be inputted directly by the user at the terminal 10 by typing, or an already typed text may be uploaded. If the terminal 10 has suitable input means, the question can also be voice-inputted through speech recognition or paper-inputted through scanning and OCR (Optical Character Recognition).

For these various purposes, a client application may be installed on the terminal 10, but alternatively a simple browser may be used.

As it will be explained, the question may be in a plurality of natural languages such as English, French, German, Italian, Spanish, etc. It is to be noted that naturally, not every language is directly supported, but the method can be ported to a new language very easily (only dictionaries and lists of stop words in the language are required).

Method

Figure 2:
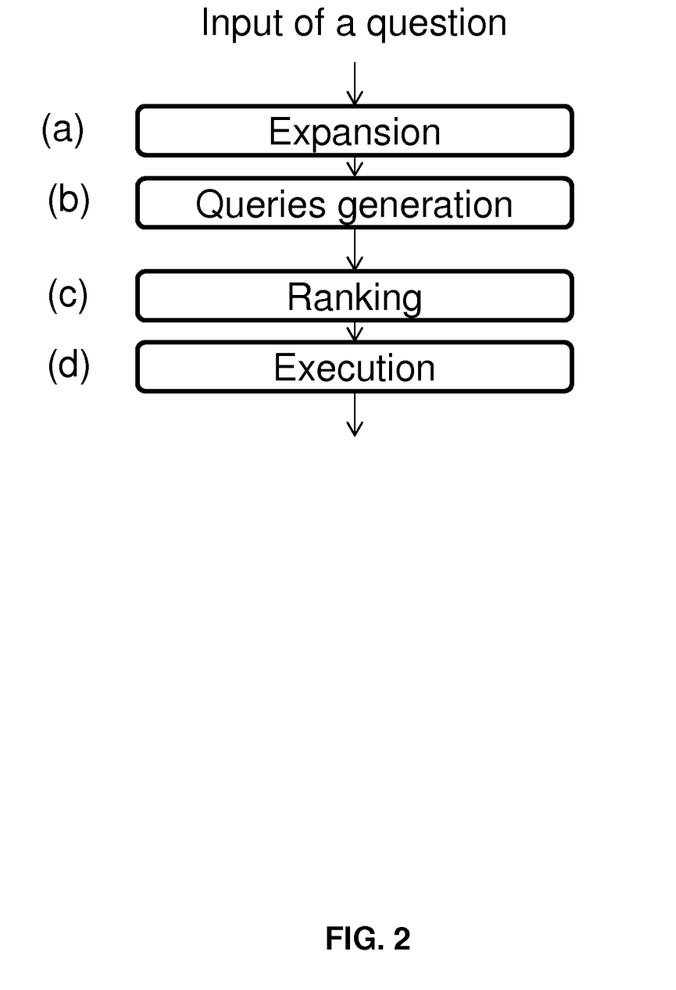
FIG. 2 schematically represents steps of the method according to the invention.

With reference to FIG. 2, the present method comprises four successive steps (a) to (d).

As a running example, we will consider the question "Give me philosophers born in Saint-Etienne".

It is important to recognize that no assumptions either about the language or the KB are made. Hence, even the processing of the running example is language- and KB-agnostic.

The present invention is based on the observation that many questions can be understood from the semantics of the words in the question while the syntax of the question has less importance.

For example, the question "Give me philosophers born in Saint-Etienne" can be reformulated in many ways like "In Saint-Etienne were born which actors?" or as a keyword question "Saint-Etienne, philosophers, born in". In this case by knowing the semantics of the words "Saint-Etienne", "philosophers", "born", we are able to deduce the intention of the user. This holds for many questions, i.e. they can be correctly interpreted without considering the syntax as the semantics of the words is sufficient for them.

Taking advantage of this observation is the main idea of the present invention. The KB encodes the semantics of the words and it can tell what is the most probable interpretation of the question (w.r.t. the knowledge model described by the KB).

More precisely, instead of trying to determine the one query exactly corresponding to the user's intent when writing the question, which is very difficult in terms of natural language processing, the present process proposes to directly generate every possible query from the question.

Indeed, even if the large majority of these queries will be absurd and not related in any way to the user's intent, one of these queries will be necessary the perfect one. And doing so is paradoxically more efficient as it does not require either complex processing or understanding of the language.

Expansion

In a first step (a) named "expansion", the processing unit 21 identifies from the KB, for each n-gram of the question which is not a stop word, as initial entities and initial relations the entities and relations of the knowledge base matching said n-gram.

In other words, all the entities or relations of the KB that could be designated by a n-gram of the question, i.e. a word, are identified. It is to be noted that by "n-gram" it is meant any combination of successive characters of the question, so that a given character of the question may belong to more than one n-gram. For example, "saint", "Étienne" and "Saint-Etienne" are three different n-grams.

Step (a) may comprise identifying the n-grams of the question. A skilled person knows technics for doing so, in particular using dictionaries of the input language. In particular every possible sequence of consecutive characters of the question may be searched in the dictionary "Stop words" are some of the most common, short function words, such as the, is, at, which, on, etc. They do not carry a lot of semantics and can be filtered out without altering the meaning of the question. Limiting the number of n-grams thus greatly speeds up the process. Usually, lists of stop words are available for each language. Some words which are very frequent in questions like "what", "which", "give" could be added to the list. Thus, step (a) can simply comprises previously identifying all the n-grams by using a dictionary, and then removing the n-grams listed in a list of stop words.

In the present example ("Give me philosophers born in Saint-Etienne", in English), stops words are "give", "me", "in". Consequently, remaining n-grams to be considered are "philosophers", "born", "born in", "saint", "Etienne", "Saint-Etienne".

For each n-gram, the entities and relations of the KB matching said n-gram are searched for in the KB. The identified one are called initial entities and initial relations. It is to be understood that classes may be further searched for in the ontology, but for the sake of clarity, classes will be considered as entities.

In a general way, each atomic element of the KB can be considered either as an entity or as a relation. The entities/relations may be more conveniently referred to as "items" or "resources" of the KB (these terms defining commonly all the elements of the KB), each identified by its IRI. Thus, the initial entities and initial relations identified could be called "initial items".

Preferably, an entity or a relation, and a n-gram, are considering matching if the name of the entity/relation and the n-gram have the same "stem". By stem it is meant the base part of a word not including inflectional morphemes, or the "root". For example, the stem of "philosophers" is "philosoph-". "philosophy" or "philosophe" share the same step.

The name of an entity/relation is called a lexicalization. For example, "first man on the moon" and "Neil Armstrong" are both lexicalizations of an entity referred to by the IRI dbr:Neil_Armstrong.

Depending on the KB, different strategies may be followed to collect lexicalizations. Since Wikidata has a rich number of lexicalizations, all lexicalizations associated to an item can be simply took through rdfs:label, skos:prefLabel and skos:altLabel. For DBpedia, it is to be noted that all lexicalizations associated to a resource through the rdfs:label property were collected for the English version. Secondly, can be followed the disambiguation and redirect links to get additional ones and took also into account available demonyms dbo:demonym (for example the lexicalization "European" can also be associated to the entity dbr:Europe). Thirdly, by following the inter-language links, the labels from the other languages can be associated to the resources.

Concerning relations, DBpedia properties are poorly covered with lexicalizations, especially when compared to Wikidata. For example, the property dbo:birthPlace has only one lexicalization namely "birth place", while the corresponding property over Wikidata has ten English lexicalizations like "birthplace", "born in", "location born", "birth city". In the exemplary implementation two strategies were implemented.

First, while aiming at a QA system for the Semantic Web interlinkings between properties of distinguished KBs can also be taken into account, s.t. lexicalizations are merged from all KBs currently considered. There, the owl:sameAs links from DBpedia relations to Wikidata are used and every lexicalization present in Wikidata is associated to the corresponding DBpedia relation. Secondly, the DBpedia abstracts are used to find more lexicalizations for the relations.

To find new lexicalizations of a relation numerous similar strategies can be followed.

To sum up, in step (a):

All entities/relations are searched whose lexicalization (up to stemming) is an n-gram N (up to stemming) in the question.

If an n-gram N is a stop word, then the entity/relation associated to it is excluded.

Each n-gram N defines a set of initial entities/relations $R_N$, so that the whole question defines a global set of initial entity/relations R (corresponding to the union of the sets of initial entities/relations for each n-gram of the question).

In the present example ("Give me philosophers born in Saint-Etienne"), 117 initial entities, relation or classes can be found for the KB DBpedia. For the n-gram "philosophers", are identified the initial entities dbr:Philosophes, dbr:Philosophy, dbr:Philosopher, dbrc:Philosophes, dbrc:Philosophers, (the last two are classes), and the initial relations dbo:philosopher, dbo:philosophicalSchool.

Many possible meanings are considered: "born" may refer to a crater (entity dbr:Born_(crater)), "saint" may refer to a software (entity dbr:SAINT_(software)) and "Saint Étienne" may refer to a band (entity br:Saint_Etienne_(band)).

Should several KBs are simultaneously used by the present method, this step (a) is performed for each of them so as to identify for each KBs initial entities and initials relations.

Queries Generation

In a step (b), the processing unit 21 generate a set of possible queries for entities of said given knowledge base, as a function of the initial entities and initial relations identified for all the n-gram of the question (i.e. all the initial entities/relations identified).

By query, it is meant as explained a request in a query language (accepted by the KB) for information retrieval from the KB Said query language is preferably a RDF query language, preferably SPARQL (i.e. said queries are SPARQL queries).

As explained, the idea is to generate each "candidate" query that could represent the possible intentions expressed by the question of the user, as driven by the lexicalizations computed. Preferably, every possible query is generated at step (b).

Preferably, the "possible" queries of the set are the ones such that:

1. The query contains as parameter at least one of the initial entities and initial relations;

2. The query matches at least one predetermined pattern.

These two conditions could be combined in this manner: the set includes each query containing one triple (and/or two triples, possibly up to K triples) that can be created starting from the initial entities/relations.

Preferably there is a third condition for a query to be included in the set of possible queries:

3. The query gives a non-empty result set. Triples of a query which gives a non-empty result set are said "connected".

It is to be noted that in a first embodiment, each possible query is generated (without knowing if it the result set is empty or not), and then executed so as to detect and discard the ones giving an empty result.

In the following description, will be described a very efficient algorithm for directly generating in a recursive way only the queries giving a non-empty result.

Thus, might be defined four patterns of queries, which reads in SPARQL:

SELECT/ASK var WHERE {s1 s2 s3.} (case of one triple)

SELECT/ASK var WHERE {s1 s2 s3. s4 s5 s6.} (case of two triples) with s1, . . . , s6 being initial entities/relations or variables and var being one of {s1, . . . ,s6} which is a variable (the projection variable).

As already explained, queries with more than two triples could be generated if the question is long enough, however it could significantly extend the processing time.

Preferably, all possible ASK type queries are generated and executed, and for each ASK type request, if it returns "true" then the corresponding SELECT type query is generated and added to the set of possible requests.

Moreover, for entity linking, the following two patterns can be optionally added: SELECT ?x WHERE {VALUES ?x {s1}.} and SELECT ?x WHERE {VALUES ?x {s1}. s1 ?p s2.} with s1, s2 being initial entities/relations, i.e. all queries returning directly one of the initial entities/relations with possibly one additional triple.

Note that these last queries just give back directly an entity and should be generated for a question like: "What is Apple Company?" or "Who is Marie Curie?".

The number of possible queries stays surprisingly low. For example, in the present example ("Give me philosophers born in Saint-Etienne") only 395 possible queries have been generated (i.e. only three query per initial entity/relation), including some "absurd" ones such as:

SELECT DISTINCT ?y WHERE {dbr:Saint_(song) ?p ?x. ?x dbo:hometown ?y.} (it returns the hometown of people related to the song "Saint");

SELECT ?x WHERE {VALUES ?x {dbr:Saint_Etienne_ (band)}} (it returns Saint-Etienne as a band);

SELECT DISTINCT ?y WHERE {?x dbo:birthPlace dbr: Saint-Etienne. ?x dbo:birthDate ?y.} (it returns the birth date of people born in Saint-Etienne);

SELECT DISTINCT ?y WHERE {?x ?p dbr:Philosophy. ?x dbo:birthDate ?y.} (it returns the birth date of people related to philosophy).

The main challenge is the efficient construction of all the possible queries. In a preferred "fast" embodiment that we will be now described, the main idea is to perform in the KB graph a breadth-first search of depth 2 starting from every initial entity. While exploring the KB for all initial entities $r_j \in R$ (where $r_j \neq r_i$) the distance $d_{ri,rj}$ between two items is stored. These numbers are used when constructing the queries shown above.

Fast Generation

In this embodiment, all triple patterns with up to K triples (preferably K=2) and one projection variable are generated recursively.

Given a triple pattern T, we only want to build connected triple pattern (i.e. of connected triples) while adding triples to T, in other words giving a non-empty result set. This could be performed very fast if the pairwise distance between initial entities are known.

Consequently, are proposed:

a first algorithm to compute the pairwise distance between every initial entity/relation of the set R in a graph G=(V,E,f) as defined previously, see "Algorithm 1" below.

a second algorithm to create all connected triple patterns from the set R of initial entities/relations with up to K triples, see "Algorithm 2" below. L contains the triple patterns created recursively and $L^{(k)}$ indicates the triple patterns with exactly k triples.

A skilled person will understand that these algorithms are preferred algorithms, the method according the present invention being not limited to them.

To compute the pairwise distance in the graph between every entity/relation in R, algorithm 1 performs a breadth-first search from every entity/relation in R in an undirected way (i.e. we traverse the graph in both directions).

An example of distance functions d as follows. Starting from a vertex r and finding the following two edges e1=(r, p1,r1), e2=(r1,p2,r2), $d_{r,p1}=1$, $d_{r,r1}=2$, $d_{r,p2}=3$ and so on.

When an edge is traversed in the opposite direction, is added a minus sign. For example, given the edges e1=(r,p1, r1) and e2=(r2,p2,r1), i.e. with respect to the first example e2 is reversed, $d_{r,p2}=-3$. For a vertex or edge r, and a variable x we artificially set $d_{r,x}$ to be any possible integer number. Moreover, we set $d_{x,y}=d_{y,x}$ for any x,y.

The algorithm 1 compute these numbers recursively and efficiently by simply traversing the graph starting from the entities (and not the relations) in R in a breadth-first search manner and keeps track of the distances as defined above. The breadth-first search is advantageously done by using HDT ("Header-Dictionary-Triple", which is a binary format for publishing and exchanging RDF data at large scale) as an indexing structure.

Note that HDT was originally developed as an exchange format for RDF files that is queryable. A rarely mentioned feature of HDT is that it is perfectly suitable for performing breadth-first search operations over RDF data. In HDT, the RDF graph is stored as an adjacency list which is an ideal data structure for breadth-first search operations. This is not the case for traditional triple-stores. The use of HDT at this point is optimal for two reasons, (1) the performance of the breadth-first search operations, and (2) the low footprint of the index in terms of disk and memory space. Roughly, a 100 GB RDF dump can be compressed to a HDT file of a size of approximately 10 GB.

Based on the numbers above, Algorithm 2 allows recursively creating all connected triple patterns from the set R of initial entities/relations of resources with up to K triples. The algorithm creates all triple patterns of 1 triple, then all triple patterns of 2 triples, etc. More precisely, the triple patterns of k+1 triples are created by attempting to add each theoretical triple of initial entities/relations to each pattern of k triples (the added triple shall be connected to each triple of the pattern).

This algorithm 2 simply verifies very efficiently the possible existence of a result of the query being generated. The idea is to notice that the computed pairwise distances could be used to immediately determine whether two triples are connected. In particular, there are only a surprisingly low number of possible combinations of pairwise distances between the initial entities/relations of two connected triples. Thus, each theoretical triple of initial entities/relations could be tried at each iteration, so as to keep only those matching one of said possible combinations of pairwise distances between the initial entities/relations with each triple of an already identified triple pattern.

Note at this end that the "if not" conditions very often are not fulfilled: if the theoretical triple does not match any one of said combinations with at least one triple of the previous triple pattern, it cannot be added, and the algorithm directly shifts to the next theoretical triple. This guarantees the speed of the process. Further, the higher k is, the lower the probability to manage to add a new triple to a previous pattern is (the size of $L^{(k)}$ is decreasing with k), so that each recursive call of the algorithm is faster.

Once the triple patterns are constructed, one can choose any of the variables, which are in subject or object position, as a projection variable.

Algorithm 1

```
for r ∈ R ∩ V do
    for e₁ =(r,p₁,r₁)∈ E do
        if p₁ ∈ R then d_{r,p1} = 1; if r₁ ∈ R then
            d_{r,r1} = 2
        for (e₂ = (r₁, p₂, r₂) ∈ E) do
            if p₂ ∈ R then d_{r,p2} = 3; if r₂ ∈ R
                then d_{r,r2} = 4;
            if p₁, p₂ ∈ R then d_{p1,p2} = 2: if
                p₁,r₂ ∈ R then d_{p1,r2} = 3
        end
        for (e₂ = (r₂, p₂, r₁) ∈ E) do
            if p₂ ∈ R then d_{r,p2} = -3; if r₂ ∈ R
                then d_{r,r2} = -4
            if p₁, p₂ ∈ R then d_{p1,p2} = -2; if
                p₁, p₂ ∈ R then d_{p1,r2} = -3
        end
    end
    for e₁ =(r₁,p₁,r)∈ E do
        if p₁ ∈ R then d_{r,p1} = -1; if r₁ ∈ R then
            d_{r,r1} = -2
        for (e₂ = (r₁, p₂, r₂) ∈ E) do
            if p₂ ∈ R then d_{r,p2} = 3; if r₂ ∈ E
                then d_{r,r2} = 4
            if p₁, p₂ ∈ R then d_{p1,p2} = 2; if
                p₁, r₂ ∈ R then d_{p1,r2} = 3
        end
        for (e₂ = (r₂,p₂, r₁) ∈ E) do
            if p₂ ∈ R then d_{r,p2} = 3; if r₂ ∈ R
                then d_{r,r2} = 4
            if p₁, p₂ ∈ R then d_{p1,p2} = 2; if
                p₁, p₂ ∈ R then d_{p1,r2} = 3
        end
    end
end
```

Algorithm 2

```
L = ∅ #list of triple patterns
V_{s, o} = ∅ #set of variables in subject, object position
V_p = ∅ #set of variables in predicate position
k=0
Function generate (L,k)
    for s₁ ∈(R∩V)∪V_{s,o}∪{x_{k,1}} do
        for s₂ ∈(R∩P)∪V_p∪{x_{k,2}} do
            for s₃ ∈ (R∩V)∪V_{s,o}∪{x_{k,3}} do
                if k = 0∧ds₂, s₃ = -1∧d_{s1, s2} = 1∧d_{s1, s3} = 2
                    then L ←L∪{(s₁,s₂,s₃)}
                for T ∈L^{(k)} do
                    b₁ =true;b₂ =true;b₃ =true; b₄ =true;
                    for (t₁,t₂,t₃)∈ T do
                        if not (s₁ = t₁ ∧ d_{t1,s2} = 2∧d_{t1,s3} =
                            3∧d_{t2,s2} = -2∧d_{t2,s3} = -3∧d_{t3,s2} =
                            -3∧d_{t3,s3} = -4) then b₁ = false
                        if not (s₁ = t₃∧d_{t1,s2} = 3∧d_{t1,s3} =
                            4∧d_{t2, s2} = 2∧d_{t2,s3} = 3∧d_{t3,s2} =
                            1∧d_{t3,s3}=2) then b₂ = false
                        if not (s₃ = t₁ ∧ d_{t1,s2} = -1∧d_{t1,s3} =
                            -4∧d_{t2,s2} = -2∧d_{t2,s3} = -3∧d_{t3,s2} =
                            -1∧d_{t3,s3}= -2) then b₃ = false
                        if not (s₃ = t₃∧d_{t1,s2} = -3∧d_{t1,s3} = 2∧
                            d_{t2, s2} = -2d_{t2, s3} = -1∧d_{t3, s2} = 1)
                        then b₄ = false
                    end
                    if b₁ = true∨b₂ =
                        true∨b₃ = true∨b₄ = true then
                        L←L∪(T∪(s₁,s₂,s₃));
                        V_{s, o} ← V_{s, o}∪{s₁,s₃};
                        V_p ← V∪{s₂})
                end
                if (k!=K)then
                    return generate(L,k+1)
                end
            end
```

-continued

Algorithm 2

```
|   |   |   end
|   |   end
|   end
```

Ranking and Execution

In a step (c), each possible query of the set is ranked as a function of at least one predetermined criterion, so as to order said set of possible queries.

If several KBs are simultaneously used by the present method, the step (b) is performed for each of them so as to generate a set of possible query for each KB, and then in step (c) each set can be ranked separately, but in a preferred embodiment they are ranked together. In other words, the sets are merged into a single one (therefore containing queries for different KBs), which is ordered.

Said ranking is representative of the probability of the query of answering correctly the question inputted in natural language.

The ranking is used to rank the possible queries so as to identify the top-ranked one. The order can be seen as a decreasing approximation to what was asked.

A simple idea is that the more a query "fits" the question, the more it is likely to represent the possible intentions expressed by the question of the user. Indeed, we can assume that the question inputted by the user has a meaning, and that the n-grams are somehow connected. Thus, if a generated query appears to use most of words of the question in a complex way (with many variables and many triples), this query is likely to reflect the user's intention; to the contrary, a simple question using only one or two words is likely to miss the point.

Therefore, said predetermined criterion is a formal criterion on the query, in particular one or more of:
 The number of variables in the query;
 The number of triples in the query;
 The number of the words in the question which are covered by the query.

For example, the first example query in the previous page is covering two words ("Saint" and "born").

Additional criteria are advantageously used, in particular one or more of:
 The edit distance of the label (the name) of an initial entity/relation used as parameters and the word it is associated to. For example, the edit distance between the label of dbp:bornYear (which is "born year") and the word "born" is 5.
 The sum of the relevance of the entities/relations used as parameters in the query (e.g., the number of inlinks and the number of outlinks of a resource). This is a knowledge base independent choice, but it is also possible to use a specific score for a KB (like page-rank);

Preferably all the five criteria are used. A linear combination of the value of these criteria can be used for calculating a score of the query. If no training data is available, the weights for such linear combination are determined manually. Otherwise we assume a training data set of questions together with the corresponding answers set, which can be used to calculate the F-measure (or $F_1$ score) for each of the possible queries.

For the present example, the 395 queries are ranked, and here is the top 4 obtained:

1. SELECT DISTINCT ?x WHERE {?x dbp:birthPlace dbr:Saint-Etienne. ?x ?y dbr:Philosopher.}
2. SELECT DISTINCT ?y WHERE {?x dbo:birthPlace dbr:Saint-Etienne. ?x dbo:philosophicalSchool ?y.}
3. SELECT DISTINCT ?x WHERE {?x dbp:birthPlace dbr:Saint-Etienne.}
4. SELECT DISTINCT ?x WHERE {?x dbo:hometown dbr:Saint-Etienne.}

The top-ranked one is the query that exactly matches the question. It is top ranked as it covers all the words of the question and contain the maximum number of triples.

The second gives philosophical schools of people born in Saint-Étienne (which, given the question, could be an interesting information for the user). The third and the fourth give people born in Saint-Étienne or that live in Saint-Étienne.

Note that, no syntactic features have been used. However, it is possible to use them to further improve the ranking.

Finally, in a step (d) said top-ranked possible query is executed, so as to return the result entities or relations. In case of several sets separately ranked (for different KBs), each top-ranked possible query may be executed.

Some of the next top ranked possible queries (for instance the second) may be further executed so as to provide the user with additional information.

Step (d) advantageously comprises the previous calculation of a confidence score for the top-ranked possible query (and possibly the next top ranked possible queries which could be executed), said top-ranked possible query being executed only if said confidence score is above a threshold.

In the other case, the user is invited to rephrase the question.

In a more general way, if there is more than one query intended to be executed (if at least one of the next ranked possible queries of a set is to be executed, of if there are several sets separately ranked for different KBs), the confidence score could be calculated for each of these queries intended to be executed, and only the ones with a confidence score above the threshold are effectively executed. The user thus would have to rephrase the question only if none of the queries could be effectively executed.

Indeed, although the quality of this processing step is high (as shown in several experiments), an additional confidence score is computed so as to verify that the top-ranked possible query really reflects the user's intent.

To this end, a model can be constructed based on logistic regression. Can be used a training set consisting of SPARQL queries and the labels true or false. True indicates if the F-score of the SPARQL query is bigger than a threshold $\theta 1$ or false otherwise. Once the model is trained, it can compute a confidence score $p_Q \in [0,1]$ for a query Q. Hence, for a correctly ordered set of possible queries, it only needs to be checked whether $p_{Q1} \geq \theta 1$ is true for the top ranked query Q1, or otherwise it is assumed that the whole set is not reflecting the user's intention. In such a case, the processing unit 21 refuses to answer the question.

Note that $p_Q$ can be interpreted as the confidence that the processing unit 21 has in the generated query Q, i.e. in the generated answer.

Advantages

The present method offers excellent results and numerous advantages over prior art:
 Joint disambiguation of entities and relations: For example, for interpreting the question "How many inhabitants has Paris?" between the hundreds of different meanings of "Paris" and "inhabitants" the top ranked queries contain the resources called "Paris" which are cities, and the property indicating the population, because only these make sense semantically.

Portability to different KBs: One problem in QA over KBs is the semantic gap, i.e. the difference between how we think that the knowledge is encoded in the KB and how it actually is. For example, in the present approach (using DBpedia as KB), for the question "What is the capital of France?", is generated the query SELECT ?x WHERE {dbr:France dbp:capital ?x.}, which probably most users would have expected, but also the query SELECT ?x {VALUES ?x {dbr:List_of_capitals_of_France}} which refers to an overview article in Wikipedia about the capitals of France and that most of the users would probably not expect. This important feature allows to port the approach to different KBs while it is independent of how the knowledge is encoded.

Ability to bridge over implicit relations: the present method allows to bridge over implicit relations. For example, given the question "Give me German mathematicians" the following top-ranked query is computed: SELECT DISTINCT ?x WHERE {?x ?p1 dbr:Mathematician. ?x ?p2 dbr:Germany.}. Here ?p1 is dbo:field, dbo:occupation, dbo:profession and ?p2 is dbo:nationality, dbo:birthPlace, dbo:death Place, dbo:residence. Note that all these properties could be intended for the given question.

Easy to port to new languages: The only parts where the language is relevant are the stop word removal and stemming. Since these are very easy to adapt to new languages, one can port the approach easily to other languages.

Permanent system refinement: It is possible to improve the system over time. The system generates multiple queries. This fact can be used to easily create new training dataset. Using these data sets one can refine the ranker to perform better on the asked questions.

System robust to malformed questions and keyword questions: There are no Natural Language Processing (NLP) tools used in the approach which makes it very robust to malformed questions. For this reason, keyword questions are also supported.

Application Fields

The present method could be used in efficient search engines, recommendation engines (for providing suggestions of movies, music, news, books, research articles, goods, etc. to the user), expert systems, etc.

It is to be noted that the present method can be directed at a precise field ("closed domain") for instance by performing the method on dedicated KBs, or only on fragments of general KBs.

The invention claimed is:

1. A method for processing a question in natural language received at a server, comprising performing by a processing unit of the server steps of:
   (a) for each n-gram of the question which is not a stop word, from at least one given knowledge base of entities linked by relations, identifying as initial entities and initial relations the entities and relations of the knowledge base matching said n-gram;
   (b) generating a set of possible queries for entities or relations of said given knowledge base, as a function of the initial entities and initial relations identified for all the n-gram of the question;
   (c) ranking each query of said set of possible queries as a function of at least one predetermined criterion, so as to identify a top-ranked possible query;
   (d) executing said top-ranked possible query, and returning the result entities or relations;
   wherein each query of said set of possible queries contains as parameter at least one of the initial entities and initial relations, and matches at least one predetermined pattern;
   wherein each query of said set of possible queries contains up to K connected triples that can be created starting from the initial entities and initial relations;
   wherein step (b) comprises computing the pairwise distance between every initial entity or initial relation, and recursively creating all connected triple patterns from the initial entities and initial relations with up to K triples as a function of the computed pairwise distances;
   wherein computing the pairwise distance between every initial entity or initial relation comprises performing a breadth-first search in an undirected way from every initial entity only, using Header-Dictionary-Triple as an indexing structure.

2. A method for processing a question in natural language received at a server, comprising performing by a processing unit of the server steps of:
   (a) for each n-gram of the question which is not a stop word, from at least one given knowledge base of entities linked by relations, identifying as initial entities and initial relations the entities and relations of the knowledge base matching said n-gram;
   (b) generating a set of possible queries for entities or relations of said given knowledge base, as a function of the initial entities and initial relations identified for all the n-gram of the question;
   (c) ranking each query of said set of possible queries as a function of at least one predetermined criterion, so as to identify a top-ranked possible query;
   (d) executing said top-ranked possible query, and returning the result entities or relations;
   wherein each query of said set of possible queries contains as parameter at least one of the initial entities and initial relations, and matches at least one predetermined pattern;
   wherein each query of said set of possible queries contains up to K connected triples that can be created starting from the initial entities and initial relations;
   wherein step (b) comprises computing the pairwise distance between every initial entity or initial relation, and recursively creating all connected triple patterns from the initial entities and initial relations with up to K triples as a function of the computed pairwise distances;
   wherein recursively creating all connected triple patterns from the initial entities and initial relations with up to K triples as a function of the computed pairwise distances comprises, for each integer k lower than K, attempting to add each theoretical triple that can be created starting from the initial entities and initial relations to each created pattern of k triples.

3. A method for processing a question in natural language received at a server, comprising performing by a processing unit of the server steps of:
   (a) for each n-gram of the question which is not a stop word, from at least one given knowledge base of entities linked by relations, identifying as initial entities and initial relations the entities and relations of the knowledge base matching said n-gram;
(b) generating a set of possible queries for entities or relations of said given knowledge base, as a function of the initial entities and initial relations identified for all the n-gram of the question;
(c) ranking each query of said set of possible queries as a function of at least one predetermined criterion, so as to identify a top-ranked possible query;
(d) executing said top-ranked possible query, and returning the result entities or relations;
wherein each query of said set of possible queries contains as parameter at least one of the initial entities and initial relations, and matches at least one predetermined pattern;
wherein each query of said set of possible queries contains up to K connected triples that can be created starting from the initial entities and initial relations;
wherein step (b) comprises computing the pairwise distance between every initial entity or initial relation, and recursively creating all connected triple patterns from the initial entities and initial relations with up to K triples as a function of the computed pairwise distances;
wherein a theoretical triple that can be created starting from the initial entities and initial relations can be added to a created pattern of k triples if said theoretical triple matches with every triple of said created triple pattern a possible combination of pairwise distances between their initial entities and/or initial relations.

4. A method for processing a question in natural language received at a server, comprising performing by a processing unit of the server steps of:
(a) for each n-gram of the question which is not a stop word, from at least one given knowledge base of entities linked by relations, identifying as initial entities and initial relations the entities and relations of the knowledge base matching said n-gram;
(b) generating a set of possible queries for entities or relations of said given knowledge base, as a function of the initial entities and initial relations identified for all the n-gram of the question;
(c) ranking each query of said set of possible queries as a function of at least one predetermined criterion, so as to identify a top-ranked possible query;
(d) executing said top-ranked possible query, and returning the result entities or relations;
wherein at least the following criteria are used in step (c):
a number of variables in the query;
a number of triples in the query;
a number of the words in the question which are covered by the query;
wherein at least the following criteria are further used in step (c):
an edit distance of a label in the knowledge base of each initial entity and initial relation used as parameter of the query and the word in the question it is associated to;
a sum of the relevance of the initial entities and initial relations used as parameters in the query.

5. The method according to claim 1, wherein each query is a SPARQL query.

6. The method according to claim 1, wherein each possible query is generated at step (b).

7. The method according to claim 1, wherein K=2 and each query of said set of possible queries is a SPARQL query following one of the patterns:
SELECT/ASK var WHERE {s1 s2 s3.}
SELECT/ASK var WHERE {s1 s2 s3. s4 s5 s6.}.

8. The method according to claim 1, wherein each possible query of said set gives a non-empty result.

9. The method according to claim 1, wherein step (d) comprises the previous calculation of a confidence score for the top-ranked possible query, said top-ranked possible query being executed only if said confidence score is above a threshold.

10. The method according to claim 1, wherein an entity or a relation of the knowledge base matches a n-gram if a name of said entity or relation and the n-gram have a common stem.

11. A non-transitory computer-readable medium comprising instruction which, when executed by a computer, cause the computer to carry out the method according to claim 1.

* * * * *